(12) United States Patent
Li et al.

(10) Patent No.: US 9,368,981 B2
(45) Date of Patent: Jun. 14, 2016

(54) SYSTEM AND METHODS FOR CURRENT BALANCING

(71) Applicant: O2Micro, Inc., Santa Clara, CA (US)

(72) Inventors: Guoxing Li, Sunnyvale, CA (US); Yan Li, Wuhan (CN); Weidong Xue, Shanghai (CN); Anquan Xiao, Shanghai (CN)

(73) Assignee: O2Micro, Inc., Santa Clara, CA (US)

( * ) Notice: Subject to any disclaimer, the term of this patent is extended or adjusted under 35 U.S.C. 154(b) by 0 days.

(21) Appl. No.: 14/328,355

(22) Filed: Jul. 10, 2014

(65) Prior Publication Data
US 2015/0015209 A1    Jan. 15, 2015

(30) Foreign Application Priority Data

Jul. 12, 2013   (CN) .............................. 201310292280

(51) Int. Cl.
*H01M 10/44* (2006.01)
*H01M 10/46* (2006.01)
*H02J 7/00* (2006.01)

(52) U.S. Cl.
CPC .................................. *H02J 7/0016* (2013.01)

(58) Field of Classification Search
CPC ..... H02J 7/0003; H02J 7/0013; H02J 7/1423; H02J 7/0014; H02J 7/0018; H02J 7/0019
USPC .......................... 320/107, 116, 118, 119, 122
See application file for complete search history.

(56) References Cited

U.S. PATENT DOCUMENTS

| | | | |
|---|---|---|---|
| 7,965,061 B2 | 6/2011 | Li et al. | |
| 8,283,895 B2 | 10/2012 | Lee et al. | |
| 8,299,755 B2 | 10/2012 | Shiu et al. | |
| 8,872,478 B2 | 10/2014 | Li | |
| 2002/0024319 A1 | 2/2002 | Haraguchi et al. | |
| 2003/0044689 A1* | 3/2003 | Miyazaki ............. | H02J 7/0026 320/116 |
| 2011/0109268 A1 | 5/2011 | Lee et al. | |
| 2011/0109270 A1* | 5/2011 | Nakao ................. | H01M 10/441 320/116 |

FOREIGN PATENT DOCUMENTS

| | | |
|---|---|---|
| CN | 101471575 A | 7/2009 |
| CN | 101499671 A | 8/2009 |
| CN | 101501955 A | 8/2009 |
| TW | 201032437 A | 9/2010 |
| TW | 201117516 A | 5/2011 |
| TW | 201141009 A | 11/2011 |
| WO | 0223664 A1 | 3/2002 |

* cited by examiner

Primary Examiner — Edward Tso (57) ABSTRACT

A battery module includes: a battery pack including multiple cells; control circuits corresponding to the cells, each control circuit including a control unit for managing the corresponding cell and a compensation unit for generating a corresponding compensation current such that the sum of the corresponding consumed current and the corresponding compensation current is equal to a target total current, where the control circuits include a first control circuit and a second control circuit, where the first control circuit includes a first control unit operating with a first consumed current, the second control circuit includes a second control unit operating with a second consumed current, and where the first control circuit conditionally generates a first compensation current and the second control circuit conditionally generates a second compensation current based on a comparison of the first consumed current and the second consumed current.

20 Claims, 5 Drawing Sheets

SYSTEM AND METHODS FOR CURRENT BALANCING

RELATED APPLICATION

This application claims priority to Chinese Patent Application Number 201310292280.3, titled "Systems and Methods for Current Balancing," filed on Jul. 12, 2013 with State Intellectual Property Office of P.R. China (SIPO).

BACKGROUND

A battery pack usually includes multiple cells connected in series to supply electric power to electronic equipment, such as an electronic vehicle, a portable computer, an electronic camera, or the like. The battery pack is usually equipped with multiple control circuits that monitor the state of each cell for capacity calculations and battery cell protection.

Figure 1:
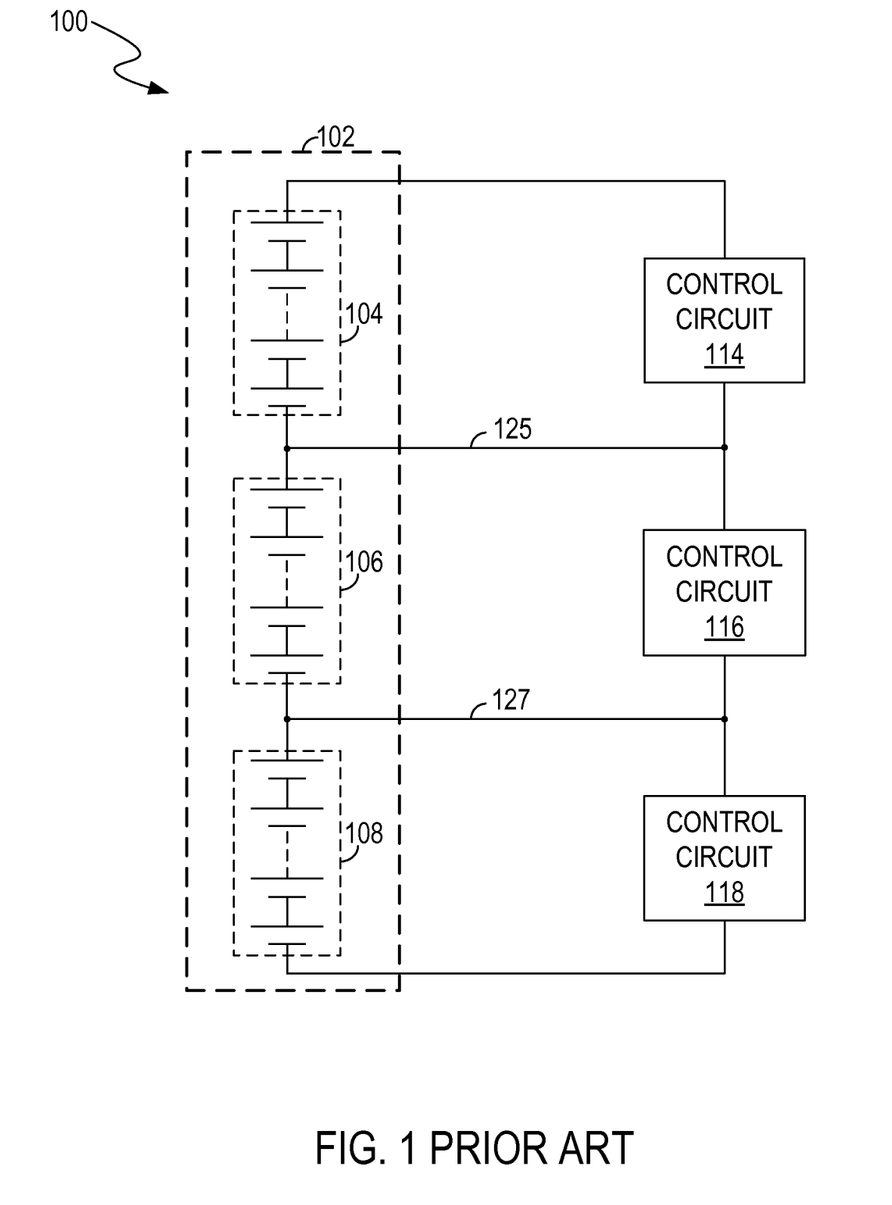
FIG. 1 is a block diagram illustrating a conventional battery management system.

FIG. 1 illustrates a conventional battery management system 100 for a battery pack 102. In the battery pack 102, cells 104, 106, and 108 are connected in series. The battery management system 100 can include control circuits 114, 116, and 118 for respectively managing the cells 104, 106, and 108. The control circuits 114 and 116 are coupled to the cells 104 and 106 through a first path 125. The control circuits 116 and 118 are coupled to the cells 106 and 108 through a second path 127. If the different control circuits consume different amounts of currents, there will be an undesired current flowing through the first path 125 and the second path 127, which may cause an imbalance between the cells and may shorten battery life.

SUMMARY

Accordingly, embodiments according to the present invention solve the aforementioned drawbacks by providing a current balancing system including a plurality of compensation units such that there is no undesired current flowing between the cells and the control circuits.

In one example, a battery module is provided. The battery module includes a battery pack including a plurality of cells; and a plurality of control circuits corresponding to the plurality of cells, each control circuit including: a control unit, operable for managing the corresponding cell, the control unit operating with a corresponding consumed current; and a compensation unit, coupled to the control unit, that is operable for generating a corresponding compensation current such that the sum of the corresponding consumed current and the corresponding compensation current is equal to a target total current, wherein the plurality of control circuits include a first control circuit and a second control circuit, the first control circuit including a first control unit operating with a first consumed current, the second control circuit including a second control unit operating with a second consumed current, and wherein the first control circuit conditionally generates a first compensation current and the second control circuit conditionally generates a second compensation current based on a comparison of the first consumed current and the second consumed current.

In another example, a method is provided. The method includes operating a first control unit of a battery module with a first consumed current, the battery module further including a plurality of cells and a plurality of control circuits; operating a second control unit of the battery module with a second consumed current; detecting a difference between the first consumed current and the second consumed current based on a detection signal; generating a compensation current based on the detection signal, and repeating the detecting and generating operations until the battery module enters a balanced working state, wherein in the balanced working state there is no current flowing through a plurality of paths between the plurality of cells and the plurality of control circuits.

In still another example, a system is provided. The system includes a first control circuit coupled to a first cell of a battery pack, the first control circuit including: a first control unit operating with a first consumed current; and a first compensation unit, coupled to the first control unit, that is operable for generating a first compensation current such that the sum of the first consumed current and the first compensation current is equal to a target total current, and a second control circuit coupled to a second cell in series with the first cell, the second control circuit including: a second control unit operating with a second consumed current; and a second compensation unit, coupled to the second control unit, that is operable for generating a second compensation current such that the sum of the second consumed current and the second compensation current is equal to the target total current, wherein the first control circuit conditionally generates the first compensation current and the second control circuit conditionally generates the second compensation current based on a comparison of the first consumed current and the second consumed current.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Reference will now be made in detail to the embodiments of the present disclosure, examples of which are illustrated in the accompanying drawings. While the present disclosure will be described in conjunction with the embodiments, it will be understood that they are not intended to limit the present disclosure to these embodiments. On the contrary, the present disclosure is intended to cover alternatives, modifications, and equivalents, which may be included within the spirit and scope of the present disclosure as defined by the appended claims.

Furthermore, in the following detailed description of embodiments of the present disclosure, numerous specific details are set forth in order to provide a thorough understanding of the present disclosure. However, it will be recognized by one of ordinary skill in the art that the present disclosure may be practiced without these specific details. In other instances, well-known methods, procedures, components, and circuits have not been described in detail as not to unnecessarily obscure aspects of the embodiments of the present disclosure.

Figure 2:
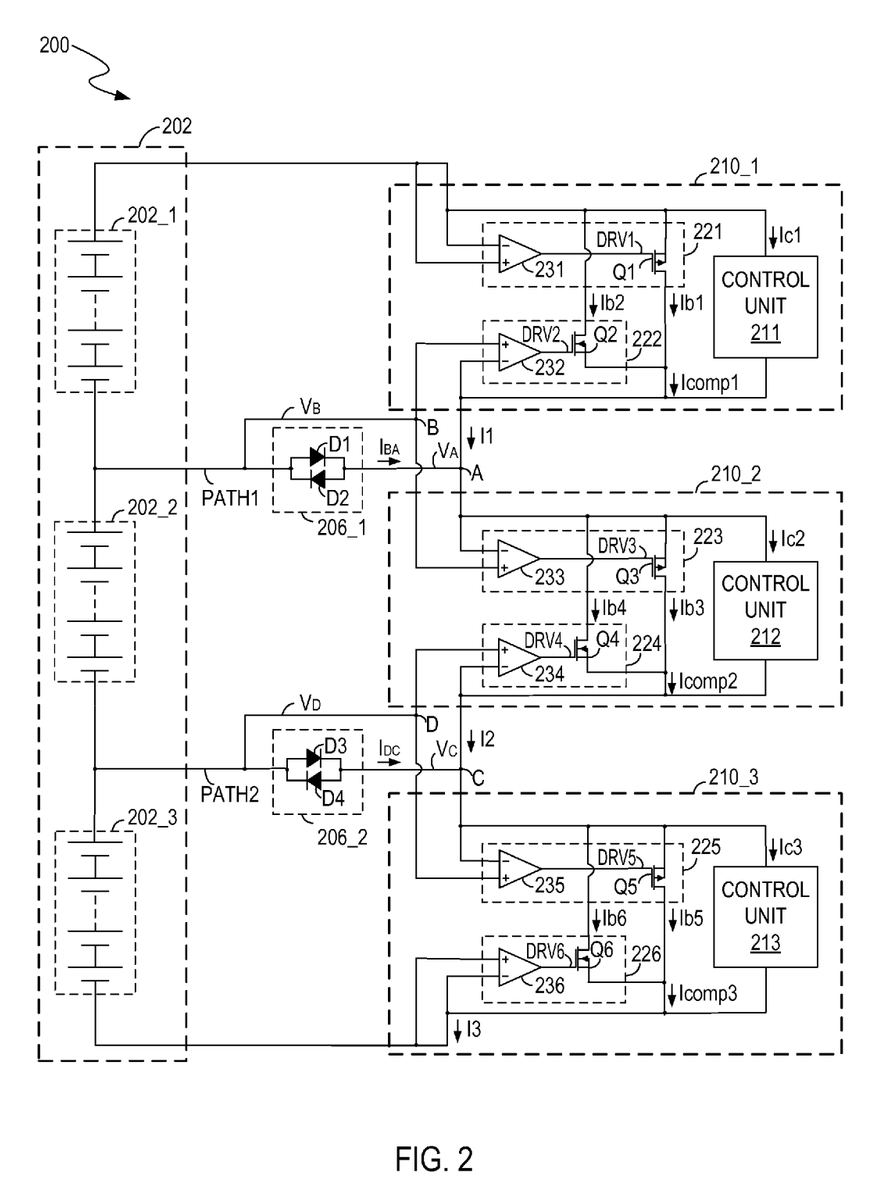
FIG. 2 is a block diagram illustrating a battery module, in an embodiment according to the present disclosure.

FIG. 2 illustrates a battery module 200, in accordance with an embodiment of the present invention. As shown in the example of FIG. 2, the battery module 200 includes a battery pack 202 having multiple cells 202_1-202_3. For illustrative purposes, three cells are shown in the example of FIG. 2. However, a different number of cells can be included in the battery pack 202. Each of the cells 202_1-202_3 has a corresponding control circuit. For example, the battery module 200 includes control circuits 210_1-210_3 for managing the cells 202_1-202_3, respectively. Each of the control circuits 210_1-210_3 monitors the state of charge (SOC) and state of health (SOH) of the corresponding cell in real time.

The control circuits 210_1 and 210_2 are coupled to the cells 202_1 and 202_2 through a first path PATH1 including a detection unit 206_1. The detection unit 206_1 can include two diodes D1 and D2, which are connected back-to-back in parallel as shown in the figure. The two ends of the diodes D1 and D2 are respectively labeled as nodes A and B, with voltage values $V_A$ and $V_B$. Similarly, the control circuits 210_2 and 210_3 are coupled to the cells 202_2 and 202_3 through a second path PATH2 including a detection unit 206_2. The detection unit 206_2 can include two diodes D3 and D4, which are connected back-to-back in parallel as shown in the figure. The two ends of the diodes D3 and D4 are labeled as nodes C and D, and have voltage values $V_C$ and $V_D$, respectively.

The control circuit 210_1 includes a control unit 211 and two compensation branches 221 and 222. The compensation branch 221 includes an operational amplifier 231 and a switch Q1, e.g., a p-channel metal-oxide-semiconductor field-effect transistor (PMOSFET). As shown in FIG. 2, the operational amplifier 231 generates a control signal DRV1 to control the switch Q1. For example, if the control signal DRV1 is in a first state (e.g., digital 0), the switch Q1 is on. If the control signal DRV1 is in a second state (e.g., digital 1), the switch Q1 is off. The compensation branch 222 includes an operational amplifier 232 and a switch Q2, e.g., an re-channel metal-oxide-semiconductor field-effect transistor (NMOSFET). As shown in FIG. 2, the operational amplifier 232 generates a control signal DRV2 to control the switch Q2. For example, if the control signal DRV2 is in a first state (e.g., digital 1), the switch Q2 is on. If the control signal DRV1 is in a second state (e.g., digital 0), the switch Q2 is off.

The operational amplifiers 231 can have a built-in voltage offset, e.g. 10 mV, so as to set the control signal DRV1 to the second state (e.g., digital 1) if the operational amplifier 231 operates in a nonlinear region and its inverting input is equal to its non-inverting input. In one embodiment, the control signal DRV1 changes to the first state (e.g., digital 0) if a voltage difference between the inverting input and the non-inverting input is greater than a voltage threshold (e.g., 0.7V). Similarly, the operational amplifiers 232 can have a built-in voltage offset, e.g. 10 mV, so as to set the control signal DRV2 to the second state (e.g., digital 0) if the operational amplifier 232 operates in a nonlinear region and its inverting input is equal to its non-inverting input. In one embodiment, the control signal DRV2 changes to the first state (e.g., digital 1) if the voltage difference between the non-inverting input and the inverting input is greater than the voltage threshold (e.g., 0.7 V).

More specifically, since the operational amplifier 231 operates in the nonlinear region and its inverting input and its non-inverting input are both coupled to a positive terminal voltage of the cell 202_1, the control signal DRV1 is always in the second state (e.g., digital 1) and the switch Q1 is kept off. Therefore, a current Ib1 flowing through the switch Q1 is kept at zero.

The control circuit 210_2 includes a control unit 212 and two compensation branches 223 and 224. The compensation branch 223 includes an operational amplifier 233 and a switch Q3, e.g., a PMOSFET. The operational amplifier 233 generates a control signal DRV3 to control the switch Q3. The compensation branch 224 includes an operational amplifier 234 and a switch Q4, e.g., an NMOSFET. The operational amplifier 234 generates a control signal DRV4 to control the switch Q4.

The control circuit 210_3 includes a control unit 213 and two compensation branches 225 and 226. The compensation branch 225 includes an operational amplifier 235 and a switch Q5, e.g., a PMOSFET. The operational amplifier 235 generates a control signal DRV5 to control the switch Q5. The compensation branch 226 includes an operational amplifier 236 and a switch Q6, e.g., an NMOSFET. The operational amplifier 236 generates a control signal DRV6 to control the switch Q6. More specifically, since the operational amplifier 236 operates in the nonlinear region and its inverting input and its non-inverting input are both coupled to a negative terminal voltage of the cell 202_3, the control signal DRV6 is always in the second state (e.g., digital 0) and the switch Q6 is kept off. Therefore, a current Ib6 flowing through the switch Q6 is kept at zero.

The inverting inputs of the operational amplifiers 232 and 233 are both coupled to node A having a voltage $V_A$. The non-inverting inputs of the operational amplifiers 232 and 233 are both coupled to node B having a voltage $V_B$. The inverting inputs of the operational amplifiers 234 and 235 are both coupled to node C having a voltage $V_C$. The non-inverting inputs of the operational amplifiers 234 and 235 are both coupled to node D having a voltage $V_D$. The control circuit 210_1, 210_2, and 210_3 can have similar structures and functions.

In operation, assume that different control circuits consume different amounts of currents, e.g., the control circuit 210_1 operates the control unit 211 with a consumed current Ic1, e.g. 40 mA. The control circuit 210_2 operates the control unit 212 with a consumed current Ic2, e.g. 50 mA. The control circuit 210_3 operates the control unit 213 with a consumed current Ic3, e.g. 60 mA. Therefore, initially there will be an undesired current flowing through the first path PATH1 and the second path PATH2. More specifically, the detection unit 206_1 can generate a detection signal (not shown) indicative of the difference between the consumed current Ic1 and Ic2 of two adjacent control units 211 and 212 by detecting voltages at the diodes D1 and D2. In this example, the detection unit 206_1 would indicate that there is a 10 mA current $I_{BA}$ flowing through the diode D1 (from B to A). Similarly, the detection unit 206_2 can generate another detection signal (not shown) indicative of the difference between the consumed current Ic2 and Ic3 of two adjacent control units 212 and 213 by detecting voltages at the diodes D3 and D4. In this example, the detection unit 206_2 would indicate that there is another 10 mA current $I_{DC}$ flowing through the diode D3 (from D to C). Thus, in this example, $V_B$ is greater than $V_A$, and $V_D$ is greater than $V_C$.

Figure 3:
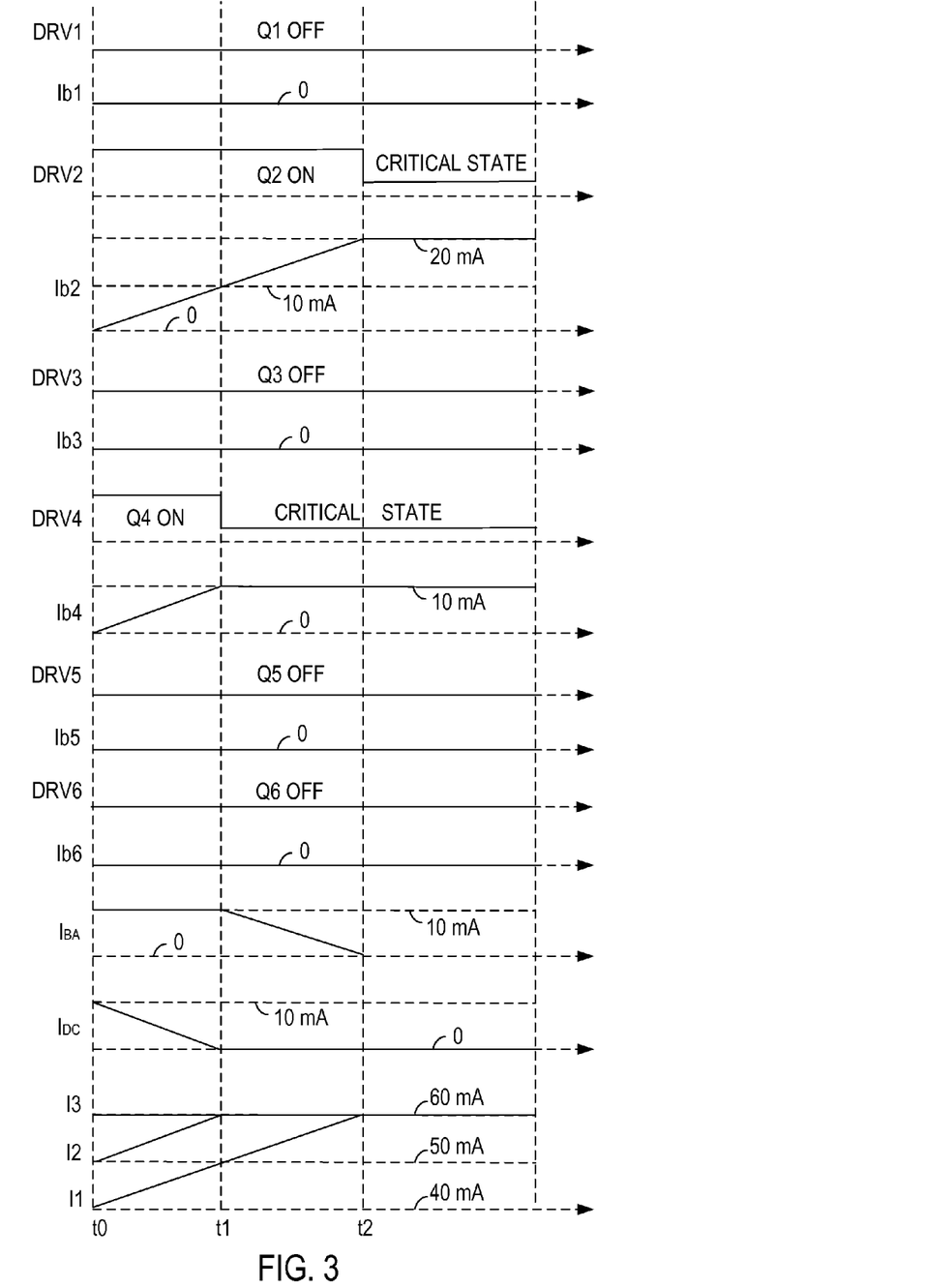
FIG. 3 illustrates an example of waveforms associated with a battery module, in an embodiment according to the present disclosure.

FIG. 3 illustrates an example of waveforms associated with the battery module 200 in FIG. 2 based upon the above example in which Ic1 is 40 mA, Ic2 is 50 mA, and Ic3 is 60 mA, in accordance with one embodiment of the present invention. FIG. 3 is described in combination with FIG. 2. More specifically, FIG. 3 shows the control signals DRV1 to DRV6, the statuses of the switches Q1 to Q6, the currents Ib1 to Ib6, the currents $I_{BA}$ and $I_{DC}$, a total current I1 of the control circuit 210_1, a total current I2 of the control circuit 210_2, and a total current I3 of the control circuit 210_3.

For the control circuit 210_3, as mentioned above, the switch Q6 is kept off and the current Ib6 flowing through the switch Q6 is kept at zero. Based upon the above example, since $V_D$ is greater than $V_C$, the control signal DRV5 generated by the operational amplifier 235 is in the second state (e.g., digital 1) and the switch Q5 is off. Therefore, a current Ib5 flowing through the switch Q5 is zero and the total current I3 of the control circuit 210_3 (e.g., Ic3+Ib5+Ib6) is 60 mA.

The following paragraphs further describe the battery module 200 in operation based on the example of FIG. 3. For the control circuit 210_2, based upon the above example, since $V_B$ is greater than $V_A$, the control signal DRV3 generated by the operational amplifier 233 is in the second state (e.g., digital 1) and the switch Q3 is off. A current Ib3 flowing through the switch Q3 is zero. Furthermore, since $V_D$ is greater than $V_C$, the control signal DRV4 generated by the operational amplifier 234 is in the first state (e.g., digital 1) and the switch Q4 is on. A current Ib4 flowing through the switch Q4 gradually increases from 0 to 10 mA. At time t1, the current Ib4 reaches 10 mA. Between t0 and t1, the current $I_{DC}$ decreases from 10 mA to zero, and the total current I2 of the control circuit 210_2 (e.g., Ic2+Ib3+Ib4) increases from 50 mA to 60 mA. Then the total current I2 of the control circuit 210_2 is equal to the total current I3 of the control circuit 210_3, and there is no current flowing through the second path PATH2.

For the control circuit 210_1, as mentioned above, the switch Q1 is kept off and the current Ib1 flowing through the switch Q1 is kept at zero. Since, in this example, $V_B$ is greater than $V_A$, the control signal DRV2 generated by the operational amplifier 232 is in the first state (e.g., digital 1) and the switch Q2 is on. A current Ib2 flowing through the switch Q2 gradually increases from 0 to 20 mA. At time t1, the current Ib2 reaches 10 mA. At time t2, the current Ib2 reaches 20 mA. Between t0 and t1, the current $I_{BA}$ remains at 10 mA. Between t1 and t2, since the total current I2 remains at 60 mA, the current $I_{BA}$ decreases from 10 mA to 0, and the total current I1 of the control circuit 210_1 (Ic1+Ib1+Ib2) increases from 50 mA to 60 mA. Then the total current I1 of the control circuit 210_1 is equal to the total current I2 of the control circuit 210_2, and there is no current flowing through the first path PATH1.

Ideally, if there is no current flowing through the first path PATH1 and the second path PATH2, then $V_A$ is equal to $V_B$ and $V_C$ is equal to $V_D$. However, in practice, there might be negligible voltage differences $V_{BA}$ and $V_{DC}$. The diodes D1-D4 operate in OFF state. Then the battery module 200 enters the balanced working state, and the operational amplifiers 231, 233, 235, and 236 operate in the nonlinear region. Therefore, the control signals DRV1, DRV3, DRV5, and DRV6 keep the switches Q1, Q3, Q5, and Q6 off, and the currents Ib1, Ib3, Ib5, and Ib6 are kept at zero.

Unlike those operational amplifiers operating in the nonlinear region, the operational amplifiers 232 and 234 operate in a linear region and form negative feedback loops according to the virtual-short and virtual-cutoff principle. The operational amplifiers 232 and 234 can amplify the voltage differences $V_{BA}$ and $V_{DC}$, respectively. Besides, the operational amplifiers 232 and 234 can set the control signals DRV2 and DRV4 to an intermediate level so as to keep the switches Q2 and Q4 in a critical state. Therefore, in the present example, the current Ib2 flowing through the switch Q2 remains at 20 mA after time t2 and the current Ib4 flowing through the switch Q4 remains at 10 mA after time t1.

Thus, in this example, the total current I1 of the control circuit 210_1 (e.g., Ic1+Ib1+Ib2) remains at 60 mA (e.g., 40 mA+0+20 mA). The total current I2 of the control circuit 210_2 (e.g., Ic2+Ib3+Ib4) remains at 60 mA (e.g., 50 mA+0+10 mA). The total current I3 of the control circuit 210_3 (e.g., Ic3+Ib5+Ib6) remains at 60 mA (e.g., 60 mA+0+0).

Though not labeled as such, each of the control circuits 210_1-210_3 can include a compensation unit for generating a corresponding compensation current such that the sum of the corresponding consumed current and the corresponding compensation current is equal to a target total current. Take the control circuits 210_1 and 210_2 as an example. The compensation unit of the control circuit 210_1 includes the compensation branches 221 and 222, and the compensation unit of the control circuit 210_2 includes the compensation branches 223 and 224. The control circuit 210_1 conditionally generates a first compensation current Icomp1 (e.g., the sum of the current Ib1 and Ib2) and the control circuit 210_2 conditionally generates a second compensation current Icomp2 (e.g., the sum of the current Ib3 and Ib4) based on a comparison of the consumed current Ic1 and Ic2. The first compensation current Icomp1 and the second compensation current Icomp2 can each be greater than or equal to 0 mA.

More specifically, if the consumed current Ic1 is greater than the consumed current Ic2, the control circuit 210_2 generates the second compensation current Icomp2 (e.g., the sum of the current Ib3 and Ib4) such that the sum of the consumed current Ic2 and the second compensation current Icomp2 is equal to the target total current (e.g., 60 mA). If the consumed current Ic2 is greater than the consumed current Ic1, the control circuit 210_1 generates the first compensation current Icomp1 (e.g., the sum of the current Ib1 and Ib2) such that the sum of the consumed current Ic1 and the first compensation current Icomp1 is equal to the target total current (e.g., 60 mA).

Advantageously, by controlling switches and compensation currents of the compensation branches, all the control circuits can consume the same total current (e.g., 60 mA) and thus there will be no current flowing through the first path PATH1 and the second path PATH2.

Again, as an example, assume that different control circuits consume different amounts of currents, e.g., the control circuit 210_1 operates the control unit 211 with the consumed current Ic1, e.g., 50 mA. The control circuit 210_2 operates the control unit 212 with the consumed current Ic2, e.g., 40 mA. The control circuit 210_3 operates the control unit 213 with the consumed current Ic3, e.g., 60 mA. Therefore, initially there will be an undesired current flowing through the first path PATH1 and the second path PATH2. More specifically, the detection unit 206_1 can generate a detection signal (not shown) indicative of the difference between the consumed current Ic1 and Ic2 of two adjacent control units 211 and 212 by detecting voltages at the diodes D1 and D2. The detection unit 206_1 indicates that there is a −10 mA current $I_{BA}$ flowing through the diode D2 (e.g., 10 mA from A to B). Similarly, the detection unit 206_2 can generate another detection signal (not shown) indicative of the difference between the consumed current Ic2 and Ic3 of two adjacent control units 212 and 213 by detecting voltages at the diodes D3 and D4. The detection unit 206_2 indicates that there is another 20 mA current flowing through the diode D3 (from D to C). Thus, in this example, $V_A$ is greater than $V_B$, and $V_D$ is greater than $V_C$.

Figure 4:
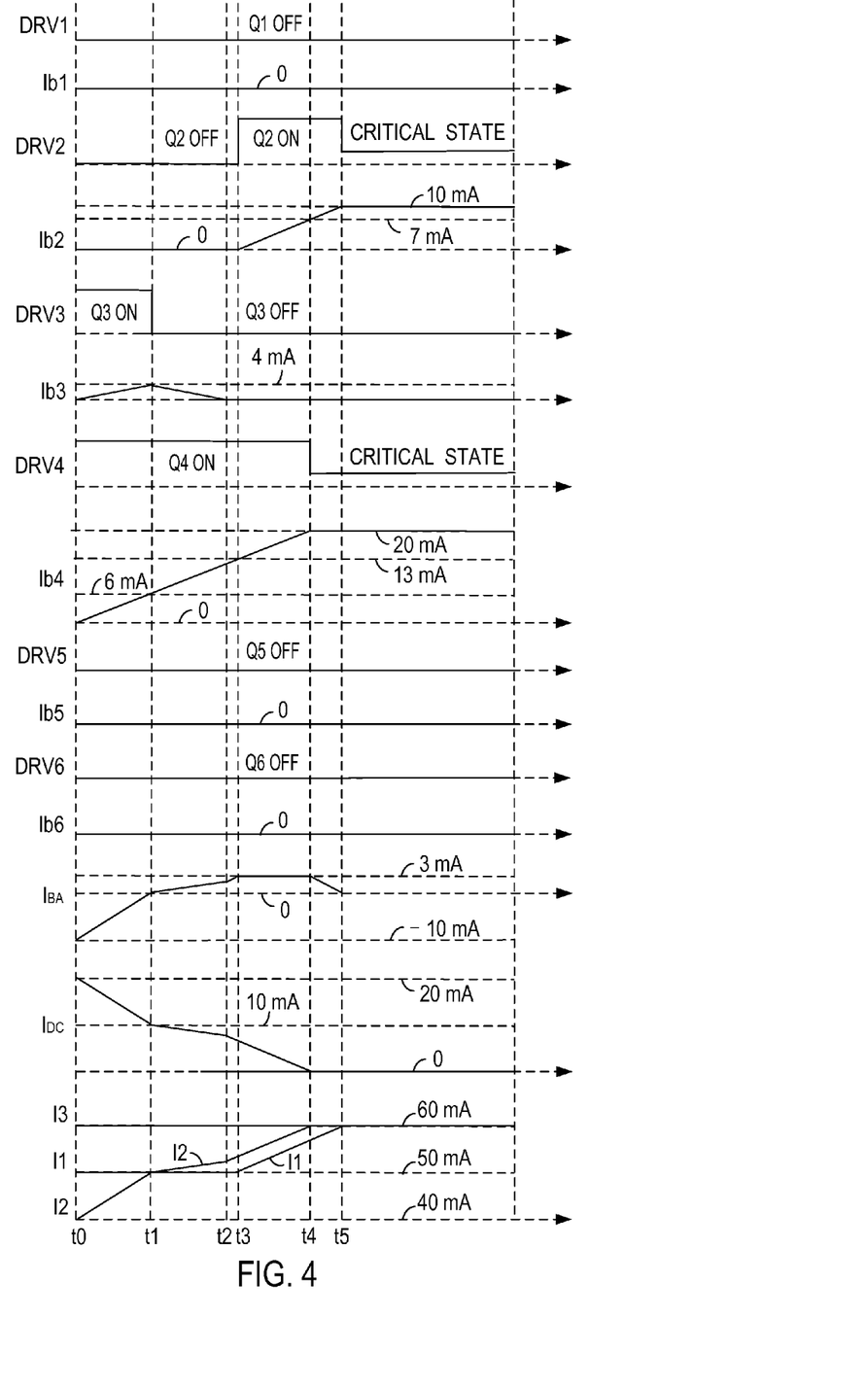
FIG. 4 illustrates another example of waveforms associated with a battery module, in an embodiment according to the present disclosure.

FIG. 4 illustrates another example of waveforms associated with the battery module 200 in FIG. 2 based upon an example in which Ic1 is 50 mA, Ic2 is 40 mA, and Ic3 is 60 mA, in accordance with one embodiment of the present invention. FIG. 4 is described in combination with FIG. 2. More specifically, FIG. 4 shows the control signals DRV1 to DRV6, the statuses of the switches Q1 to Q6, the currents Ib1 to Ib6, the currents $I_{BA}$ and $I_{DC}$, the total current I1 of the control circuit 210_1, the total current I2 of the control circuit 210_2, and the total current I3 of the control circuit 210_3.

For the control circuit 210_3, as mentioned above, the switch Q6 is kept off and the current Ib6 flowing through the switch Q6 is kept at zero. Since $V_D$ is greater than $V_C$, the control signal DRV5 generated by the operational amplifier 235 is in the second state (e.g., digital 1) and the switch Q5 is off. Therefore, the current Ib5 flowing through the switch Q5 is zero and the total current I3 of the control circuit 210_3 (e.g., Ic3+Ib5+Ib6) is 60 mA.

The following paragraphs further describe the battery module 200 in operation based on the example of FIG. 4. For the control circuit 210_2, between t0 and t1, since $V_A$ is greater than $V_B$, the control signal DRV3 generated by the operational amplifier 233 is in the first state (e.g., digital 0) and the switch Q3 is on. The current Ib3 flowing through switch Q3 gradually increases from 0 to a first value (e.g., 4 mA). Furthermore, since $V_D$ is greater than $V_C$, the control signal DRV4 generated by the operational amplifier 234 is in the first state (e.g., digital 1) and the switch Q4 is on. The current Ib4 flowing through the switch Q4 gradually increases from 0 to a second value (e.g., 6 mA). While the foregoing description represents that the first value is less than the second value, it will be understood that the first value and the second value can be set to other values and that the second value can be less than the first value. At time t1, the current Ib3 reaches 4 mA and the current Ib4 reaches 6 mA, and so the total current I2 of the control circuit 210_2 (e.g., Ic2+Ib3+Ib4) changes from 40 mA to 50 mA. The total current I2 of the control circuit 210_2 is equal to the total current I1 of the control circuit 210_1 at time t1, and is greater than the total current I1 after time t1. After I2 becomes greater than I1, the current $I_{BA}$ changes from negative (from A to B) to positive (from B to A), and the $V_B$ turns to be greater than $V_A$. Therefore, from time t1, the control signal DRV3 changes to the second state (e.g., digital 1) and the switch Q3 is off. The current Ib3 flowing through the switch Q3 gradually decreases from the first value (e.g., 4 mA) to 0. At time t2, the current Ib3 reaches 0. Between t1 and t4, the current Ib4 continues to increase from 6 mA to 20 mA. At time t4, the current Ib4 reaches 20 mA. Between t0 and t4, the current $I_{DC}$ decreases from 20 mA to 0, and the total current I2 of the control circuit 210_2 (e.g., Ic2+Ib3+Ib4) increases from 40 mA to 60 mA. Then the total current I2 of the control circuit 210_2 is equal to the total current I3 of the control circuit 210_3, and there is no current flowing through the second path PATH2.

For the control circuit 210_1, as mentioned above, the switch Q1 is kept off and the current Ib1 flowing through the switch Q1 is kept at zero. Between t0 and t1, since $V_A$ is greater than $V_B$, the control signal DRV2 generated by the operational amplifier 232 is in the second state (e.g., digital 0) and the switch Q2 is off. When the voltage difference between $V_B$ and $V_A$ is greater than the voltage threshold (e.g., 0.7 V) then the operational amplifier 232 is activated and the control signal DRV2 can change to the first state (e.g., digital 1). In the example of FIG. 4, the operational amplifier 232 is activated if the current different between I2 and I1 (e.g., $I_{BA}$) is greater than a current threshold (e.g., 3 mA) such that the voltage different between $V_B$ and $V_A$ is greater than the voltage threshold (e.g., 0.7 V). At time t3, the current Ib4 reaches 13 mA, the current I2 reaches 53 mA, and the current $I_{BA}$ reaches 3 mA. Then, the control signal DRV2 changes to the first state (e.g., digital 1) and the switch Q2 is on. The current Ib2 flowing through the switch Q2 gradually increases from 0 to 10 mA. At time t4, the current Ib2 reaches 7 mA. At time t5,
the current Ib2 reaches 10 mA. Between t3 and t4, the current $I_{BA}$ remains at 3 mA. Between t4 and t5, since the total current I2 remains at 60 mA, the current $I_{BA}$ decreases from 3 mA to 0, and the total current I1 of the control circuit 210_1 (e.g., Ic1+Ib1+Ib2) increases from 57 mA to 60 mA. Then the total current I1 of the control circuit 210_1 is equal to the total current I2 of the control circuit 210_2, and there is no current flowing through the first path PATH1.

As mentioned above, ideally, if there is no current flowing through the first path PATH1 and the second path PATH2, $V_A$ is equal to $V_B$ and $V_C$ is equal to $V_D$. However, in practice, there might be negligible voltage differences $V_{BA}$ and $V_{DC}$. The diodes D1-D4 operate in the OFF state. Then the battery module 200 enters the balanced working state, and the operational amplifiers 231, 233, 235, and 236 operate in the non-linear region. Therefore, the control signals DRV1, DRV3, DRV5, and DRV6 keep the switches Q1, Q3, Q5, and Q6 off and the currents Ib1, Ib3, Ib5, and Ib6 are kept at zero.

Unlike those operational amplifiers operating in the non-linear region, the operational amplifiers 232 and 234 operate in a linear region and form negative feedback loops according to the virtual-short and virtual-cutoff principle. The operational amplifiers 232 and 234 can amplify the voltage differences $V_{BA}$ and $V_{DC}$, respectively. Besides, the operational amplifiers 232 and 234 can set the control signals DRV2 and DRV4 to an intermediate level so as to keep the switches Q2 and Q4 in a critical state. Therefore, the current Ib2 flowing through the switch Q2 remains at 10 mA after time t5 and the current Ib4 flowing through the switch Q4 remains at 20 mA after time t4.

In this manner, the total current I1 of the control circuit 210_1 (e.g., Ic1+Ib1+Ib2) remains at 60 mA (e.g., 50 mA+0+10 mA). The total current I2 of the control circuit 210_2 (e.g., Ic2+Ib3+Ib4) remains at 60 mA (e.g., 40 mA+0+20 mA). The total current I3 of the control circuit 210_3 (e.g., Ic3+Ib5+Ib6) remains at 60 mA (e.g., 60 mA+0+0).

Advantageously, by controlling switches and compensation currents of the compensation branches, all the control circuits can consume the same total current (e.g., 60 mA) and there can be no current flowing through the first path PATH1 and the second path PATH2.

While the foregoing description represents embodiments of the present disclosure, it will be understood that the consumed currents of the control circuits 210_1 to 210_3 can be set differently and are not limited to those embodiments of FIG. 3 and FIG. 4. Besides, relevant compensation procedures and time points (e.g., t1-t5) can be determined by bandwidths and slew rates of those operational amplifiers (e.g., the operational amplifiers 231-236).

The compensation branch currents in different conditions are shown as Table 1. For reasons of simplicity, Table 1 only shows the final value of each compensation branch current when the battery module 200 is in the balanced working state. As can be seen in Table 1, for each condition, the dynamic compensation process can ensure that the total current I1 (e.g., Ic1+Ib1+Ib2), I2 (e.g., Ic2+Ib3+Ib4), and I3 (e.g., Ic3+Ib5+Ib6) are all equal with each other and keep the battery module 200 in a balanced working state.

TABLE 1

|  | Ib1 | Ib2 | Ib3 | Ib4 | Ib5 | Ib6 |
|---|---|---|---|---|---|---|
| Ic1 > Ic2 > Ic3 | 0 | 0 | Ic1-Ic2 | 0 | Ic1-Ic3 | 0 |
| Ic3 > Ic2 > Ic1 | 0 | Ic3-Ic1 | 0 | Ic3-Ic2 | 0 | 0 |
| Ic1 > Ic3 > Ic2 | 0 | 0 | Ic1-Ic2 | 0 | Ic1-Ic3 | 0 |
| Ic3 > Ic1 > Ic2 | 0 | Ic3-Ic1 | 0 | Ic3-Ic2 | 0 | 0 |

TABLE 1-continued

|  | Ib1 | Ib2 | Ib3 | Ib4 | Ib5 | Ib6 |
|---|---|---|---|---|---|---|
| Ic2 > Ic1 > Ic3 | 0 | Ic2-Ic1 | 0 | 0 | Ic2-Ic3 | 0 |
| Ic2 > Ic3 > Ic1 | 0 | Ic2-Ic1 | 0 | 0 | Ic2-Ic3 | 0 |

Figure 5:
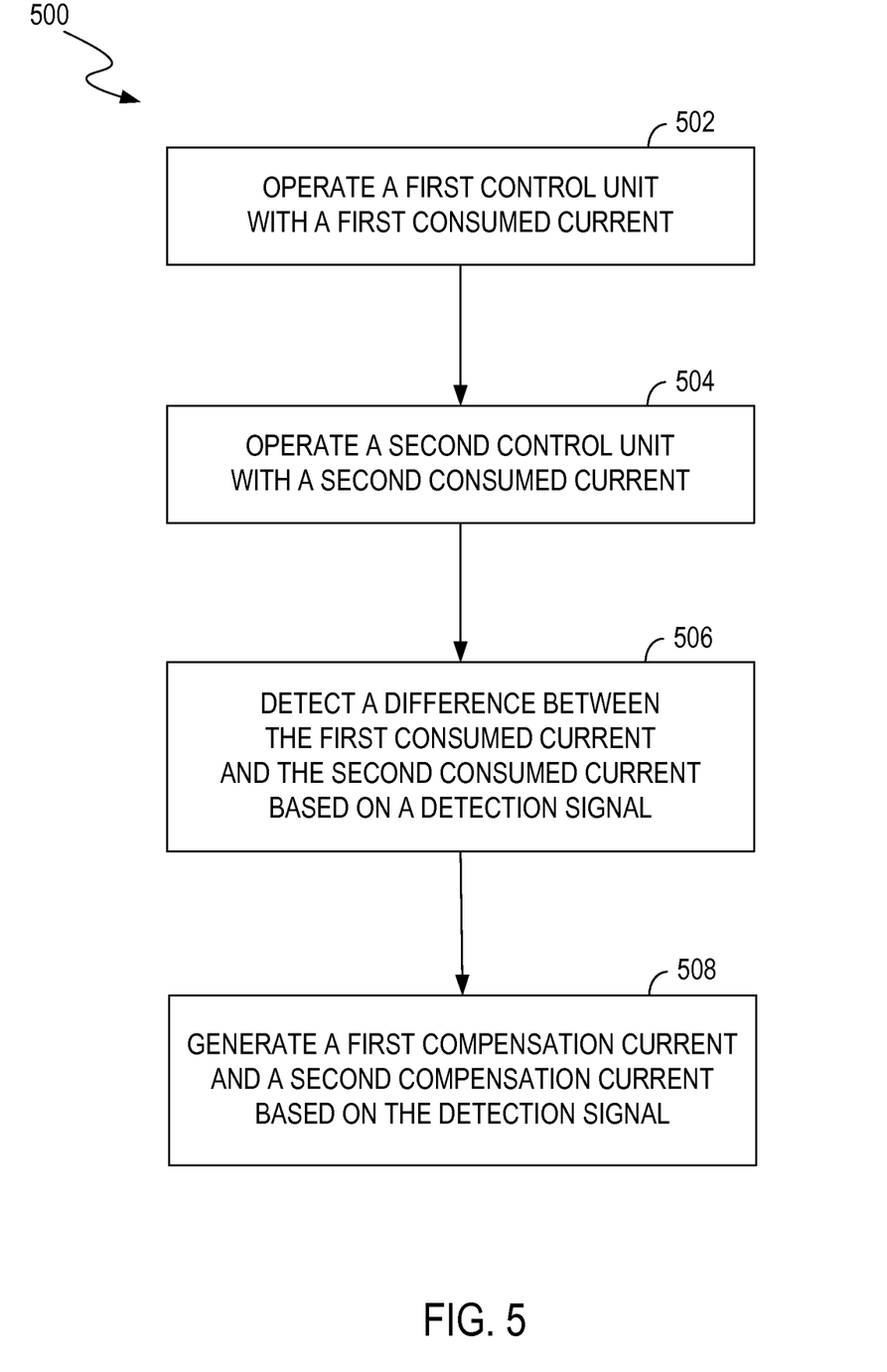
FIG. 5 is a flowchart illustrating an example of a method for balancing current of a battery module in an embodiment according to the present disclosure.

FIG. 5 is a flowchart illustrating an example of a method 500 for balancing current of a battery module in an embodiment according to the present disclosure. FIG. 5 will be described with reference to FIG. 2 to FIG. 4; however, it is not limited to those embodiments.

At block 502, a first control circuit (e.g., the control circuit 210_1) operates a first control unit (e.g., the control unit 211) with a first consumed current (e.g., the consumed current Ic1).

At block 504, a second control circuit (e.g., the control circuit 210_2) operates a second control unit (e.g., the control unit 212) with a second consumed current (e.g., the consumed current Ic2). In the present embodiment, each control circuit manages a corresponding cell and includes a compensation unit.

At block 506, the first control circuit and the second control circuit detect a difference between the first consumed current and the second consumed current based on a detection signal.

At block 508, the first control circuit (e.g., the control circuit 210_1) conditionally generates a first compensation current (e.g., the current Ib2) and the second control circuit (e.g., the control circuit 210_2) conditionally generates a second compensation current (e.g., the current Ib3) based on a comparison of the first consumed current and the second consumed current. For example, a compensation current is generated based on the detection signal. More specifically, if the detection signal indicates that the first consumed current is greater than the second consumed current, then the second control circuit generates the second compensation current such that the sum of the second consumed current and the second compensation current is equal to a target total current. Similarly, if the detection signal indicates that the second consumed current is greater than the first consumed current, then the first control circuit generates the first compensation current such that the sum of the first consumed current and the first compensation current is equal to a target total current. The target total current can be equal to the first consumed current or the second consumed current. However, if there are more than two control circuits, the target total current can be different from the first consumed current and the second consumed current.

The above detecting and generating operations (blocks 506 and 508, respectively) can be repeated until the battery module enters a balanced working state. In the balanced working state, there is no current flowing through multiple paths between the cells and the control circuits.

In summary, in embodiments according to the present invention, a current balancing system is provided for managing a battery pack. The battery pack includes multiple cells. The cell balancing system includes multiple control circuits to manage the cells respectively. Each control circuit can include at least one compensation unit. Advantageously, by using the compensation units, the control circuits consume the same total current and there is no current flowing through the paths between the cells and the control circuits. Therefore, there is no undesired current flowing between the cells and the control circuits.

While the foregoing description and drawings represent embodiments of the present disclosure, it will be understood that various additions, modifications, and substitutions may be made therein without departing from the spirit and scope of the principles of the present disclosure as defined in the accompanying claims. One skilled in the art will appreciate that the present disclosure may be used with many modifications of form, structure, arrangement, proportions, materials, elements, and components and otherwise, used in the practice of the disclosure, which are particularly adapted to specific environments and operative requirements without departing from the principles of the present disclosure. The presently disclosed embodiments are therefore to be considered in all respects as illustrative and not restrictive, the scope of the present disclosure being indicated by the appended claims and their legal equivalents, and not limited to the foregoing description.

We claim:

1. A battery module, comprising:
a battery pack comprising a plurality of cells; and
a plurality of control circuits corresponding to the plurality of cells, each control circuit comprising:
   a control unit, operable for managing the corresponding cell, the control unit operating with a corresponding consumed current; and
   a compensation unit, coupled to the control unit, that is operable for generating a corresponding compensation current such that the sum of the corresponding consumed current and the corresponding compensation current is equal to a target total current,
wherein the plurality of control circuits comprise a first control circuit and a second control circuit, the first control circuit comprising a first control unit operating with a first consumed current, the second control circuit comprising a second control unit operating with a second consumed current, and wherein the first control circuit conditionally generates a first compensation current and the second control circuit conditionally generates a second compensation current based on a comparison of the first consumed current and the second consumed current.

2. The battery module of claim 1, wherein if the first consumed current is greater than the second consumed current, then the second control circuit generates the second compensation current such that the sum of the second consumed current and the second compensation current is equal to the target total current.

3. The battery module of claim 1, wherein if the second consumed current is greater than the first consumed current, then the first control circuit generates the first compensation current such that the sum of the first consumed current and the first compensation current is equal to the target total current.

4. The battery module of claim 1, wherein each compensation unit comprises:
a first compensation branch, operable for generating a first branch current, the first compensation branch comprising a first operational amplifier and a first switch controlled by an output of the first operational amplifier; and
a second compensation branch, operable for generating a second branch current, the second compensation branch comprising a second operational amplifier and a second switch controlled by an output of the second operational amplifier,
wherein the sum of the first branch current and the second branch current is equal to the corresponding compensation current.

5. The battery module of claim 4, wherein the first switch is a PMOSFET, wherein the first switch is on if the output of the first operational amplifier is in a first state, wherein the first switch is off if the output of the first operational amplifier is in a second state, and wherein the first switch has a built-in voltage offset that sets the output of the first operational amplifier to the second state if the first operational amplifier operates in a nonlinear region and if the first operational amplifier's inverting input is equal to its non-inverting input.

6. The battery module of claim 4, wherein the first switch is a PMOSFET, wherein the first switch is on if the output of the first operational amplifier is in a first state, wherein the first switch is off if the output of the first operational amplifier is in a second state, and wherein the output of the first operational amplifier changes to the first state if a voltage difference between the first operational amplifier's inverting input and non-inverting input is greater than a voltage threshold.

7. The battery module of claim 4, wherein the second switch is an NMOSFET, wherein the second switch is on if the output of the second operational amplifier is in a first state, wherein the second switch is off if the output of the second operational amplifier is in a second state, and wherein the second switch has a built-in voltage offset that sets the output of the second operational amplifier to the second state if the second operational amplifier operates in a nonlinear region and if the second operational amplifier's inverting input is equal to its non-inverting input.

8. The battery module of claim 4, wherein the second switch is an NMOSFET, wherein the second switch is on if the output of the second operational amplifier is in a first state, wherein the second switch is off if the output of the second operational amplifier is in a second state, and wherein the output of the second operational amplifier changes to the first state if a voltage difference between the second operational amplifier's non-inverting input and inverting input is greater than a voltage threshold.

9. The battery module of claim 1, further comprising:
a plurality of detection units, wherein one of the detection units is coupled between the first control circuit and the second control circuit, operable for generating a detection signal indicative of a difference between the first consumed current and the second consumed current,
wherein the first control circuit and the second control circuit are coupled to the corresponding cells through the detection unit, and wherein the first control circuit and the second control circuit generate the first compensation current and the second compensation current, respectively, based on the detection signal.

10. The battery module of claim 9, wherein each detection unit comprises two diodes connected back-to back in parallel.

11. The battery module of claim 10, wherein each detection unit detects voltages at the two diodes to generate the detection signal.

12. The battery module of claim 1, wherein if the battery module enters a balanced working state, then there is no current flowing through a plurality of paths between the plurality of cells and the plurality of control circuits.

13. A method comprising:
operating a first control unit of a battery module with a first consumed current, the battery module further comprising a plurality of cells and a plurality of control circuits;
operating a second control unit of the battery module with a second consumed current;
detecting a difference between the first consumed current and the second consumed current based on a detection signal;
generating a compensation current based on the detection signal; and
repeating the detecting and generating operations until the battery module enters a balanced working state, wherein in the balanced working state there is no current flowing through a plurality of paths between the plurality of cells and the plurality of control circuits.

14. The method of claim 13, wherein if the detection signal indicates that the second consumed current is greater than the first consumed current, then a first control circuit generates a first compensation current such that the sum of the first consumed current and the first compensation current is equal to a target total current.

15. The method of claim 13, wherein if the detection signal indicates that the first consumed current is greater than the second consumed current, then a second control circuit generates a second compensation current such that the sum of the second consumed current and the second compensation current is equal to a target total current.

16. The method of claim 13, wherein the detection signal is generated by a detection unit coupled between the first control circuit and the second control circuit, and wherein the detection unit comprises two diodes connected back-to back in parallel.

17. The method of claim 16, wherein the detection signal is generated by detecting voltages at the two diodes.

18. A system comprising:
a first control circuit coupled to a first cell of a battery pack, the first control circuit comprising:
a first control unit operating with a first consumed current; and
a first compensation unit, coupled to the first control unit, that is operable for generating a first compensation current such that the sum of the first consumed current and the first compensation current is equal to a target total current, and
a second control circuit coupled to a second cell in series with the first cell, the second control circuit comprising:
a second control unit operating with a second consumed current; and
a second compensation unit, coupled to the second control unit, that is operable for generating a second compensation current such that the sum of the second consumed current and the second compensation current is equal to the target total current,
wherein the first control circuit conditionally generates the first compensation current and the second control circuit conditionally generates the second compensation current based on a comparison of the first consumed current and the second consumed current.

19. The system of claim 18, wherein the first compensation unit and the second compensation unit each comprises:
a first compensation branch, operable for generating a first branch current, the first compensation branch comprising a first operational amplifier and a first switch controlled by an output of the first operational amplifier; and
a second compensation branch, operable for generating a second branch current, the second compensation branch comprising a second operational amplifier and a second switch controlled by an output of the second operational amplifier,
wherein the sum of the first branch current and the second branch current is equal to the compensation current of the corresponding control circuit.

20. The system of claim 18, wherein the first control circuit and the second control circuit are coupled to the first cell and the second cell through a detection unit, wherein the detection unit is operable for generating a detection signal indicative of a difference between the first consumed current and the second consumed current, and wherein the first control circuit is operable for generating the first compensation current based on the detection signal, and wherein the second compensation current is operable for generating the second compensation current based on the detection signal.

* * * * *